US007817088B2

(12) United States Patent
Lou et al.

(10) Patent No.: US 7,817,088 B2
(45) Date of Patent: Oct. 19, 2010

(54) BEAMFORMING MULTIPLE-INPUT MULTIPLE-OUTPUT HYBRID AUTOMATIC REPEAT REQUEST RETRANSMISSION

(75) Inventors: Hanqing Lou, Garland, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 18 days.

(21) Appl. No.: 12/248,938

(22) Filed: Oct. 10, 2008

(65) Prior Publication Data

US 2009/0102715 A1 Apr. 23, 2009

Related U.S. Application Data

(60) Provisional application No. 60/981,166, filed on Oct. 19, 2007.

(51) Int. Cl.
*H01Q 3/00* (2006.01)
*H01Q 3/02* (2006.01)
(52) U.S. Cl. .................. 342/374; 342/373; 342/377
(58) Field of Classification Search .................. 342/81, 342/154, 372–374, 377
See application file for complete search history.

(56) References Cited

U.S. PATENT DOCUMENTS 7,710,319 B2 * 5/2010 Nassiri-Toussi et al. ..... 342/377

2009/0232245 A1 * 9/2009 Lakkis ......................... 375/267
2009/0239565 A1 * 9/2009 Han et al. ..................... 455/512

FOREIGN PATENT DOCUMENTS

EP 1501210 A1 1/2005

OTHER PUBLICATIONS

Hottinen A., Tirkkonen O., Wichman R.: "Multi-Antenna Transceiver Techniques for 3G and Beyond," 2003, John Wiley & Sons Ltd., West Sussex, England, pp. 34-35.
International Search Report and Written Opinion dated Mar. 16, 2009; cited in PCT/US2008/080075.

* cited by examiner

*Primary Examiner*—Dao L Phan

(57) ABSTRACT

Techniques are provided for improving hybrid automatic repeat request retransmissions techniques in a beamformed multiple-input multiple-output wireless communication environment. At a first device comprising a first plurality of antennas, a plurality of beamforming weight vectors are applied to a corresponding plurality of signal streams for simultaneous transmission to a second device having a plurality of antennas. A determination is made whether the plurality of signal streams need to be retransmitted from the first device to the second device. When a retransmission needs to be made, an order in which the plurality of beamforming weight vectors are applied to the plurality of signal streams is switched for a retransmission attempt of the plurality of signal streams from the first device to the second device.

19 Claims, 5 Drawing Sheets

BEAMFORMING MULTIPLE-INPUT MULTIPLE-OUTPUT HYBRID AUTOMATIC REPEAT REQUEST RETRANSMISSION

CROSS REFERENCE TO RELATED APPLICATION

This application claims priority to U.S. Provisional Application No. 60/981,166, filed Oct. 19, 2007, the entirety of which is incorporated herein by reference.

TECHNICAL FIELD

The present disclosure relates to wireless communication technology and particularly to multiple-input multiple-output (MIMO) wireless communication systems.

BACKGROUND

MIMO wireless communication systems comprise multiple-antenna wireless communication devices on both ends of a communication link, e.g., at a base station (BS) and a mobile station (MS). MIMO wireless communication techniques can enhance the radio link reliability and increase the system capacity through diversity gain and multiple signal stream transmission. Beamformed MIMO schemes have demonstrated significant benefits for MIMO systems. Through proper beamforming, the channel condition of a MIMO channel matrix can be improved and the signal strength of all the signal streams to be transmitted from one device to the other can be increased.

In a beamforming MIMO system, the BS transmits up to K=min(M,N) data streams simultaneously, where M is the number of antennas at the BS and N is the number of antennas at the MS. In this way, the BS assigns to the MS up to K beams, or beam patterns that are associated with the channel condition between the BS and a particular MS. The beamforming weight vectors needed to achieve the best beam patterns can be computed when spatial signature information between the antennas of the BS and the antennas of the particular MS is known.

Hybrid automatic repeat request (HARQ) transmission techniques are used in wireless communication systems when an original transmission is not received by the destination device. In one variation of a HARQ technique, the same original message is retransmitted when necessary, and the receiver combines the retransmitted message with the previously received original message in order to decode the original message. Another HARQ technique is called "incremental redundancy" and involves transmission of only a portion of the original message, and more specifically, a different portion of the original message at each retransmission attempt.

Techniques are provided herein to improve the performance of any type of HARQ retransmission scheme in a MIMO wireless communication system.

DESCRIPTION OF EXAMPLE EMBODIMENTS

Overview

Techniques are provided for improving hybrid automatic repeat request (HARQ) retransmissions techniques in a beamformed multiple-input multiple-output (MIMO) wireless communication environment. At a first device comprising a first plurality of antennas, a plurality of beamforming weight vectors are applied to a corresponding plurality of signal streams for simultaneous transmission to a second (destination) device having a plurality of antennas. A determination is made whether the plurality of signal streams need to be retransmitted from the first device to the second device. When a retransmission needs to be made, an order in which the plurality of beamforming weight vectors are applied to the plurality of signal streams is switched for a retransmission attempt of the plurality of signal streams from the first device to the second device. By switching the order of the beamforming weight vectors as applied to the signal streams for each retransmission attempt, temporal and spatial diversity is introduced thereby increasing the likelihood that the signal streams will be received and detected successfully by the second device.

Figure 1:
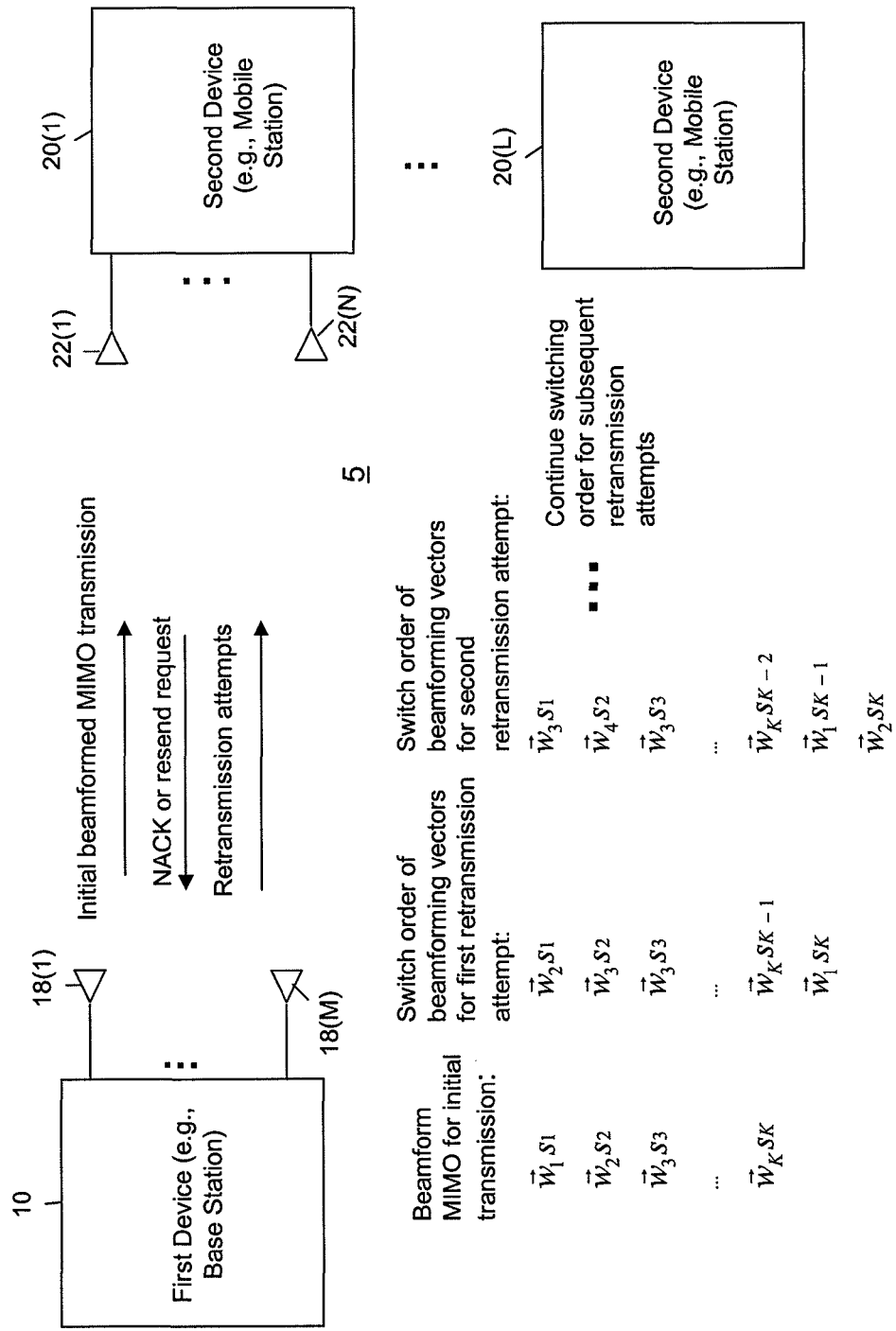
FIG. 1 is an example of a wireless communication system that employs a beamforming MIMO HARQ beam switching process between first and second wireless communication devices.

Referring first to FIG. 1, an example of a wireless communication system is shown generally at 5, and comprises a first wireless communication device 10 and at least one second wireless communication device 20(1). The first device 10 is, for example, a base station (BS) and the second device 20(1) is, for example, a mobile station (MS). The BS 10 may connect to other wired data network facilities (not shown) and in that sense serves as a gateway or access point through which a plurality of MS's 20(1)-20(L) have access to those data network facilities. For purposes of an example described herein, the BS 10 is communicating with a particular MS, e.g., MS 20(1).

The BS 10 comprises a plurality of antennas 18(1)-18(M) and the MS 20(1) comprises a plurality of antennas 22(1)-22(N). The BS 10 may wirelessly communicate with the MS 20(1) using a wideband wireless communication protocol in which the bandwidth is much larger than the coherent frequency bandwidth. An example of such a wireless communication protocol is the IEEE 802.16 communication standard, also known commercially as WiMAX™. Another example of a wireless communication protocols is the IEEE 802.11 communication standard, also know commercially as WiFi™.

In a hybrid automatic repeat request (HARQ) scheme, the BS 10 makes an initial transmission to the MS 20(1). In this case, the initial transmission is a MIMO transmission where a plurality of signal streams $s_1, s_2, \ldots, s_K$ are weighted by a corresponding one of a plurality of beamforming weight vectors $\vec{w}_1, \vec{w}_2, \ldots, \vec{w}_K$, $K \leq \min(M, N)$ for simultaneously transmitting the plurality of signal streams $s_1, s_2, \ldots, s_K$ via the plurality of antennas 18(1)-18(M) of the BS 10 to the plurality of antennas 22(1)-22(N) of the MS 20(1). The beamforming weight vectors $\vec{w}_1, \vec{w}_2, \ldots, \vec{w}_K$ are, in this example, M-dimensional vectors, that weight (in magnitude and phase) the respective signal stream for each of the antennas 18(1)-18(M) of the BS 10.

If the MS 20(1) receives the transmission with too many errors to be corrected it transmits a resend request to the BS 10. Or the BS 10 may consider non-receipt of an acknowledgement (ACK) message from the MS 20(1) within a predetermined period of time as a non-ACK (NACK), indicating that the MS 20(1) never received the transmission. In either case, the BS 10 then retransmits the original transmission (message), but with a switched ordering of the beamforming weight vectors $\vec{w}_1, \vec{w}_2, \ldots, \vec{w}_K$ as indicated in FIG. 1. In the example shown in FIG. 1, at the initial transmission the beamforming weight vectors $\vec{w}_1, \vec{w}_2, \ldots, \vec{w}_K$ are applied to corresponding numbered signal streams $s_1, s_2, \ldots, s_K$, such that beamforming weight vector $\vec{w}_1$ is applied to signal stream $s_1$, beamforming weight vector $\vec{w}_2$ is applied to signal stream $s_2$, and so on. At the first retransmission attempt, the ordering of the beamforming weight vector is switched, for example shifted by one position, such that the beamforming weight vector $\vec{w}_2$ is applied to the first signal stream $s_1$, the beamforming weight vector $\vec{w}_3$ is applied to the second signal stream $s_2, \ldots$, the beamforming weight vector $\vec{w}_K$ is applied to the signal stream $s_{K-1}$ and the beamforming weight vector $\vec{w}_1$ is applied to the signal stream $s_K$. At the second retransmission attempt, the order of the weight vectors are switched or shifted yet another position such that beamforming weight vector $\vec{w}_3$ is applied to the second signal stream $s_1$, beamforming weight vector $\vec{w}_4$ is applied to the second signal stream $s_2$, and so on as shown in FIG. 1. At each subsequent retransmission attempt, the order of the beamforming weight vectors as applied to the plurality of signal streams $s_1, s_2, \ldots, s_K$ would be shifted or switched one position again.

If the BS 10 has updated channel information available between an initial transmission and a retransmission attempt, or between successive retransmission attempts, the BS 10 may compute updates to the beamforming weight vectors $\vec{w}_1, \vec{w}_2, \ldots, \vec{w}_K$ with that information. Consequently, the beamforming weight vectors at a retransmission attempt may be different from the beamforming weight vectors used at a prior retransmission attempt (or at the initial transmission) and their order of application to the signal streams will also be changed according to the scheme described above.

Since a different beamforming weight vector is used for each signal stream at each retransmission attempt, the chances of the MS 20(1) receiving the MIMO transmission is increased by exploiting spatial and temporal diversity across the retransmission attempts. The MS 20(1) has (and needs) no knowledge of how the ordering of the beamforming weight vectors are switched. Thus, the BS 10 can perform the beamforming weight vector order switching scheme and the MS 20(1) is completely "blind" to it.

Figure 2:
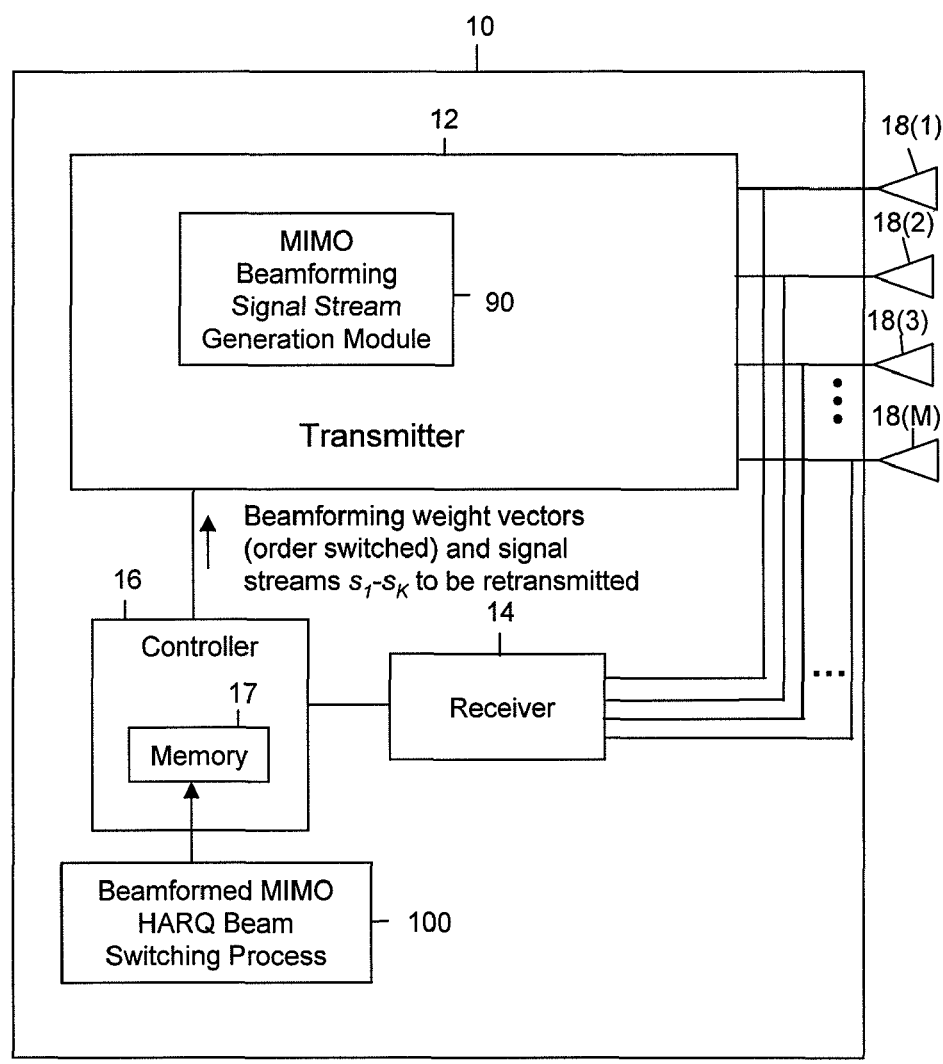
FIG. 2 illustrates an example of a block diagram of a wireless communication device configured to perform a beamforming MIMO HARQ beam switching process.

Turning to FIG. 2, an example of a block diagram is shown of the BS 10 that is configured to perform a beamforming MIMO HARQ beam switching process as generally depicted in FIG. 1. The BS 10 comprises a transmitter 12, a receiver 14 and a controller 16. The controller 16 supplies data to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits that supply respective upconverted signals to corresponding ones of a plurality of antennas 18(1)-18(M) for transmission. For simplicity, these individual transmitter circuits are not shown. To this end, the transmitter 12 comprises a MIMO beamforming signal stream generation module 90 that applies respective ones of the beamforming weight vectors $\vec{w}_1, \vec{w}_2, \ldots, \vec{w}_K$ to corresponding ones of a plurality of signal streams $s_1, s_2, \ldots, s_K$ to be transmitted via the antennas 18(1)-18(M). The receiver 14 receives the signals detected by each of the antennas and supplies corresponding antenna-specific receive signals to controller 16. It is understood that the receiver 14 may comprise a plurality of individual receiver circuits, each for a corresponding one of a plurality of antennas and which outputs a receive signal associated with a signal detected by a respective one of the plurality of antennas 18(1)-18(M). For simplicity, these individual receiver circuits are not shown.

The controller 16 comprises a memory 17 or other data storage block that stores data used for the techniques described herein. The memory 17 may be separate or part of the controller 16. In addition, logic instructions for performing a beamforming MIMO HARQ beam switching process 100 may be stored in the memory 17 for execution by the controller 16. The process 100 generates the beamforming weight vectors $\vec{w}_1, \vec{w}_2, \ldots, \vec{w}_K$ and arranges their ordering for use by the beamforming signal stream(s) generation module 90 in applying the so ordered beamforming weight vectors to corresponding ones of the signal streams $s_1, s_2, \ldots, s_K$.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor). Moreover, the functions of the beamforming signal stream generation module 90 and the beamforming MIMO HARQ beam switching process 100 may be performed by the same logic component, e.g., the controller 16, which may also perform modem functions.

Figure 3:
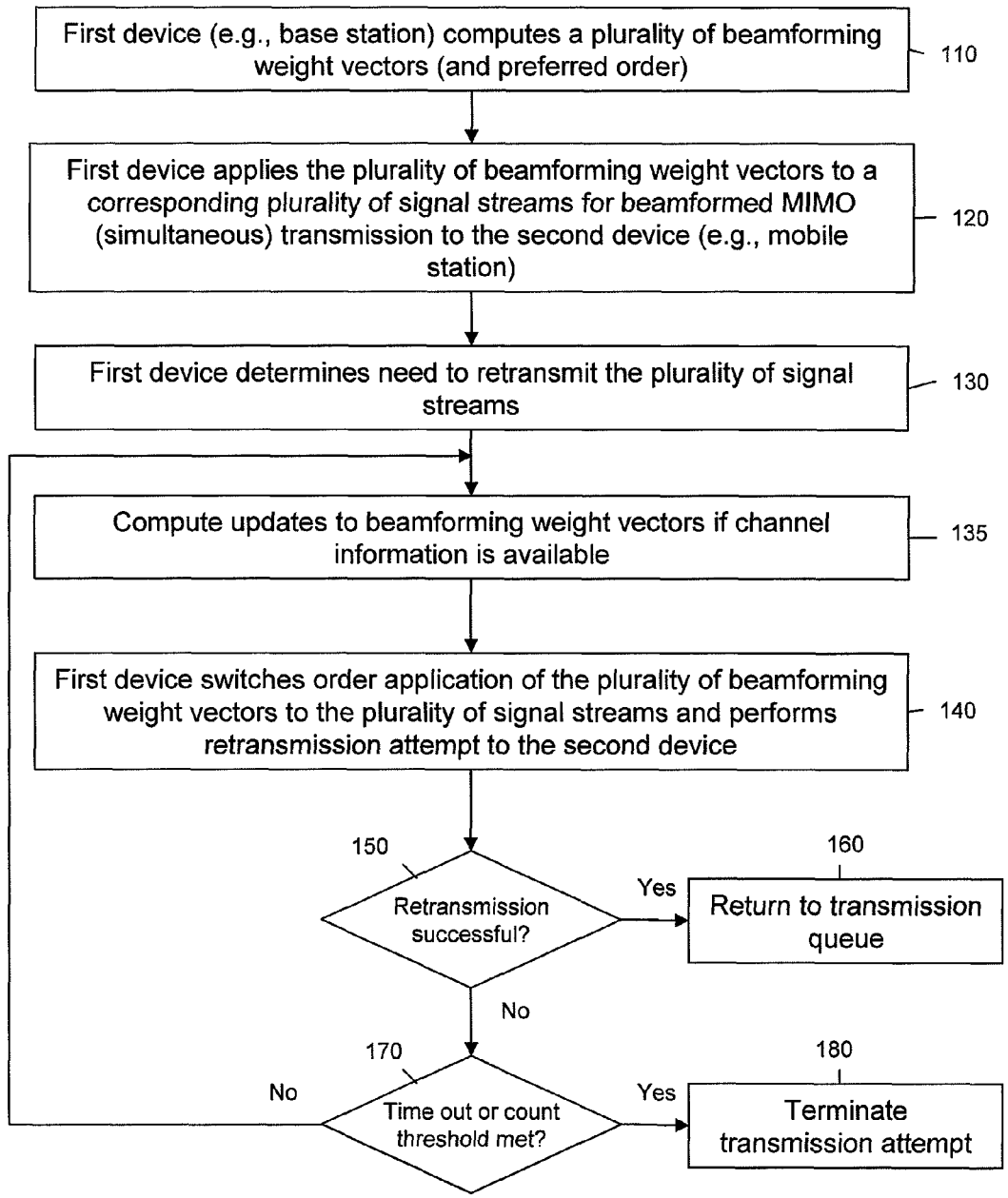
FIG. 3 is an example of a flow chart depicting the beamforming MIMO HARQ beam switching process.

The beamforming MIMO HARQ beam switching process 100 is now described with reference to the flow chart shown in FIG. 3. In this description, the first device is considered to be the BS 10 and the second device is the MS 20(1), following the example system configuration of FIG. 1. However, this is only by way of example.

At 110, the BS 10 computes the beamforming weight vectors $\vec{w}_1, \vec{w}_2, \ldots, \vec{w}_K$. The beamforming weight vectors may be computed using any of a variety of computation techniques now known or hereinafter developed. For example, the BS 10 may derive information about the wireless communication channel between its plurality of antennas 18(1)-18(M) and the plurality of antennas of the destination device, e.g., antennas 20(1)-20(N) of MS 20(1), and use that information to compute appropriate beamforming weights. In a time division duplex (TDD) system, the channel information may be derived from signals that the BS 10 receives from the MS 20(1) using either a so-called open-loop process or a closed-loop process. The MS 20(1) may send known pilot signals embedded in data transmitted to the BS 10, from which the BS 10 can derive channel information and compute the beamforming weight vectors. Further still, the MS 20(1) may transmit known training signals to the BS 10, or the BS 10 may transmit known training signals to the MS 20(1), where each device on the link uses the known training signals to compute appropriate transmit beamforming weights. The MS may obtain channel information from pilots and training signals from BS as well. In a frequency division duplex (FDD) system, since the downlink and uplink transmissions use different frequency bands, it cannot be assumed that the uplink channel and the downlink channel are the same. Therefore, in order to obtain channel information in an FDD system, the BS could send a message to the MS requesting the MS to feedback the channel information that the MS measured from a transmission made by the BS to the MS.)

Furthermore, when the plurality of beamforming weight vectors $\vec{w}_1, \vec{w}_2, \ldots, \vec{w}_K$ are computed at 110, they may have a certain ordering to them. For example, if a singular value decomposition (SVD) computation is used to generate the beamforming weight vectors, the beamforming weight vectors $\vec{w}_1, \vec{w}_2, \ldots, \vec{w}_K$ are eigenvectors corresponding to the K largest eigenvalues of a matrix quantity, and the preferred order of the beamforming weight vectors is in descending order (of eigenvector) by size of their corresponding eigenvalues. That is, beamforming weight vector $\vec{w}_1$ is the eigenvector corresponding to the largest eigenvalue, beamforming weight vector $\vec{w}_2$ is the eigenvector corresponding to the next largest eigenvalue, and so on. This descending order of the beamforming weight vectors $\vec{w}_1, \vec{w}_2, \ldots, \vec{w}_K$ by corresponding eigenvalues may be switched at 140 as described hereinafter.

At 120, the BS 10 applies the plurality of beamforming weight vectors $\vec{w}_1, \vec{w}_2, \ldots, \vec{w}_K$ computed at 110 to a corresponding plurality of signal streams $s_1, s_2, \ldots, s_K$ for beamformed MIMO transmission to the MS 20(1). The transmission at 120 is the initial beamformed MIMO transmission.

At 130, the BS 10 determines whether there is a need to retransmit the plurality of signal streams. Specifically, the BS 10 may receive a specific retransmission request from the MS 20(1), or may decide to retransmit the plurality of signals streams based on a NACK with respect to the initial transmission. The retransmission may be the entirety of the initial transmission or a portion thereof.

As explained above, the beamforming weight vectors may be updated if channel information is available. In particular, as shown at 135, the beamforming weight vectors may be updated between the initial transmission and the first retransmission attempt, and also between subsequent retransmission attempts (i.e., between the first retransmission attempt and the second transmission attempt, between the second retransmission attempt and the third retransmission attempt, and so on). Therefore, the beamforming weight vectors from one transmission attempt to the next may be different prior to their re-ordering at 140 for the next retransmission attempt.

When a retransmission attempt is to be made, then at 140 the BS 10 switches the order of application of the plurality of beamforming weight vectors $\vec{w}_1, \vec{w}_2, \ldots, \vec{w}_K$ to the plurality of signals streams $s_1, s_2, \ldots, s_K$ and performs the retransmission with that ordering. One example of a switching scheme is described above in connection with FIG. 1, and additional examples of switching schemes are described hereinafter in connection with FIGS. 4 and 5.

After a retransmission attempt at 140, at 150 the BS 10 determines whether the retransmission attempt was successful, for example, by the BS 10 receiving an ACK message from the MS 20(1). When the BS 10 determines that the retransmission attempt is successful, then at 160, the BS 10 returns to its normal transmission queue or other appropriate state. When at 150 the BS 10 determines that the transmission attempt was not successful, then the process continues to 170.

At 170, the BS 10 determines whether a time-out condition or retransmission attempt threshold is met. If so, then the BS 10 terminates any further attempts to transmit the plurality of signal streams for that transmission session. When the BS 10 determines that the time-out condition or retransmission threshold is not met, then the process goes back to 140 where the BS 10 again switches the order of the beamforming weight vectors and applies the re-ordered beamforming weight vectors to the plurality of signal streams for a retransmission attempt. Thus, the loop shown in FIG. 3 repeats for further retransmission attempts until a time-out or attempt count threshold is met or until the MS 20(1) sends an ACK message indicating that it received the retransmission.

Figure 4:
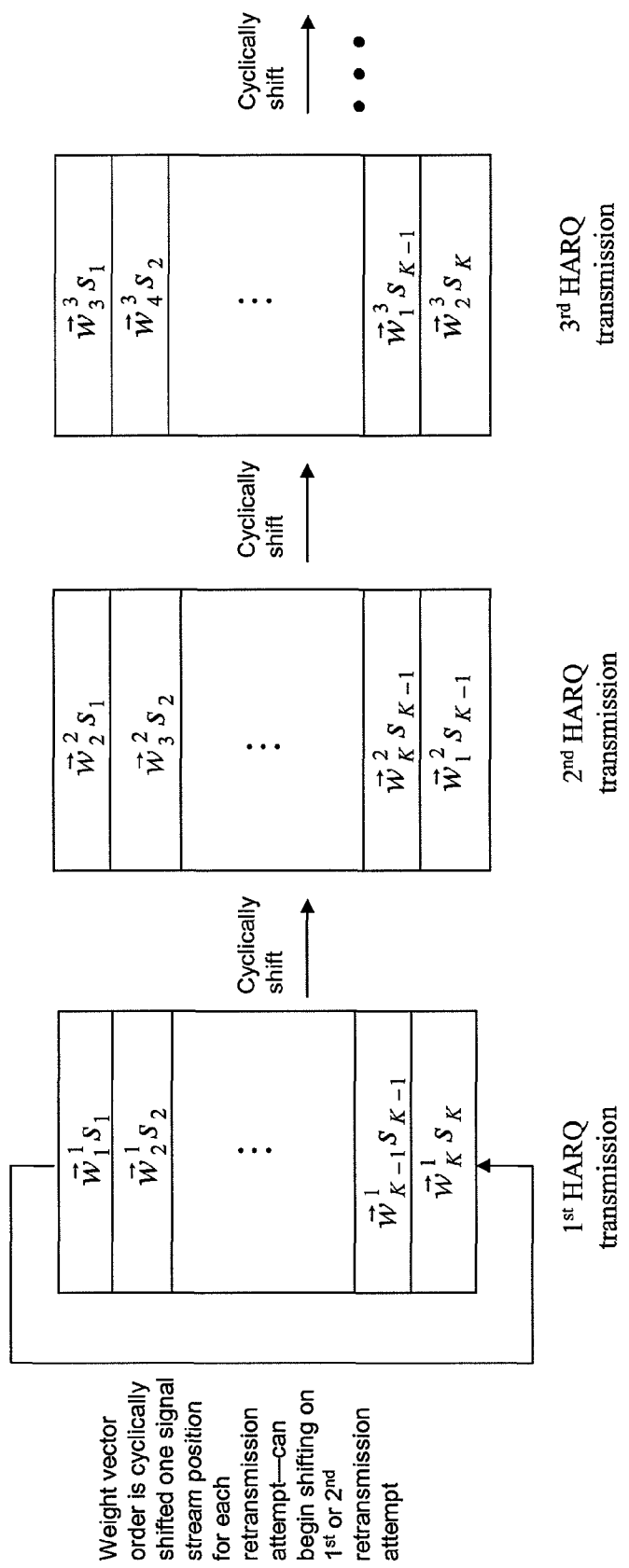
FIG. 4 is a diagram depicting one example of how the ordering of beamforming weight vectors are switched at retransmission attempts according to the beamforming MIMO HARQ beam switching process.

FIG. 4 shows one example of a beamforming weight vector order switching scheme. The order switching scheme shown in FIG. 4 involves cyclically shifting the weight vectors one signal stream position for each retransmission attempt. FIG. 4 also shows that the same beamforming weight vector ordering used for the initial transmission is used at a first retransmission attempt. In this sense, the scheme shown in FIG. 4 is slightly different from the scheme shown in FIG. 1, and is intended to illustrate yet another example or variation on the order switching concept. In FIG. 4, $\vec{w}_i^j$ is the $i^{th}$ beamforming weighting vector for the $j^{th}$ HARQ transmission attempt, and $\{s_1, \ldots, s_K\}$ are the K signal streams or modulated symbols to be transmitted simultaneously over the M transmit antennas of the BS 10 to the MS 20(1). FIG. 4 shows that at the second HARQ transmission attempt, the ordering of the beamforming weight vectors is shifted such that the second beamforming weight vector $\vec{w}_2$ is applied to the first signal stream $s_1$, the third beamforming weight vector $\vec{w}_3$ is applied to the second signal stream $s_2, \ldots$, and the first beamforming weight vector $\vec{w}_1$ is applied to the last signal stream $s_K$. At the third HARQ transmission attempt, the ordering of the beamforming weight vectors is shifted one position again. Thus, FIG. 3 shows a switching scheme whereby the ordering of the beamforming weight vectors is cyclically shifted one position (one signal stream position) for each HARQ transmission attempt. It should be understood that the switching scheme could be switched more than one position, e.g., two positions, three positions, etc., instead of one position for each HARQ transmission attempt as shown in FIG. 1. In general, FIG. 3 depicts a beamforming weight vector switching scheme in which an order of the plurality of beamforming weight vectors is cyclically shifted by at least one signal stream.

Figure 5:
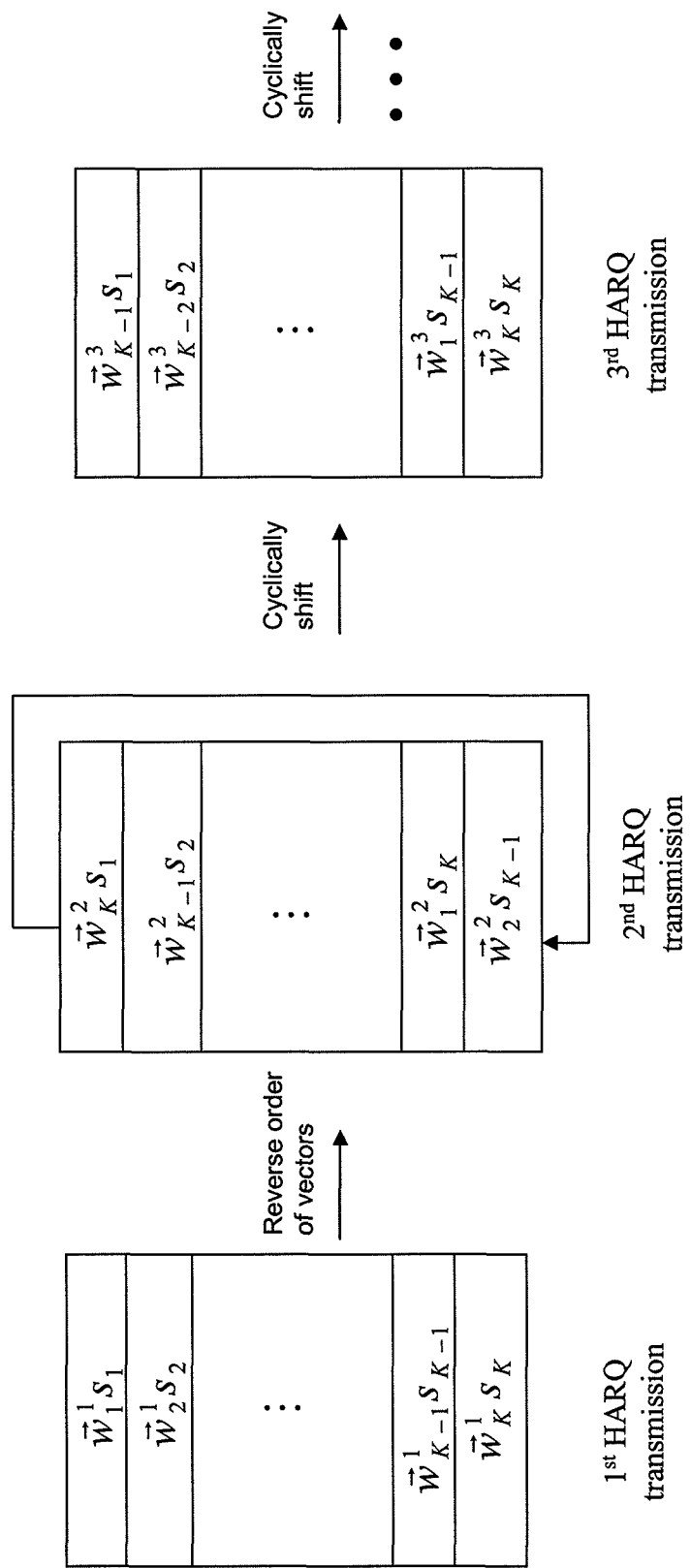
FIG. 5 is a diagram depicting another example of how the ordering of beamforming weight vectors are switched at retransmission attempts according to the beamforming MIMO HARQ beam switching process.

FIG. 5 illustrates another order switching scheme example where the order of the beamforming weight vectors is reversed at the second HARQ transmission such that the first beamforming weight vector $\vec{w}_1$ is applied to the last signal stream $s_K$, the second beamforming weight vector $\vec{w}_2$ is applied to the next to last signal stream $s_{K-1}, \ldots$, and the last beamforming weight vector $\vec{w}_K$ is applied to the first signal stream $s_1$. However, at the next ($3^{rd}$) HARQ transmission, the order of the beamforming weight vectors is cyclically shifted one position (in this example), and is continued to be shifted one position for all subsequent transmissions. It should be understood that the subsequent cyclically shifting at the $3^{rd}$ and subsequent transmission may be more than one position. Moreover, it is also envisioned that the order of the beamforming weight vectors may be completely switched back to the original order used for the initial transmission and first HARQ transmission, and continued to be switched back and forth between the reverse order shown for the $2^{nd}$ HARQ transmission in FIG. 5 and the original order shown for the first HARQ transmission in FIG. 5.

FIGS. 4 and 5 are only examples of order switching schemes. It should be understood that there are numerous other order switching schemes that are possible.

As yet another example, when the beamforming weight vectors are computed as eigenvectors corresponding to the largest eigenvalues of a matrix quantity, the ordering of the beamforming weight vectors may be made with attention to the fact that the original ordering of the weight vectors is in descending order by eigenvalue size. That is, as described above, when SVD is used to calculate the beamforming weight vectors, usually the first beamforming vector $\vec{w}_1$ is the eigenvector corresponding to the largest eigenvalue. The last beamforming weight vector $\vec{w}_K$ is the eigenvector corresponding to the $K^{th}$ largest eigenvalue. Between transmission attempts, a new or updated set of beamforming weight vectors may be computed (if channel information is available) in this manner such that the signal that would be transmitted with beamforming weight vector $\vec{w}_1$ is the strongest signal among the K simultaneously transmitted signals. When the order of the beamforming weight vectors is switched (as at 140 in FIG. 3), the resulting (new) order is such that each signal (among these K signals) could have a chance to use the strongest beamforming weight vector, such as by way of the order switching examples shown in FIGS. 1, 4 and 5. Said another way, the order switching of the beamforming weight vectors is made with respect to the preferred descending order of the newly computed or updated beamforming weight vectors.

Thus, according to the techniques described herein, the order of the beamforming weighting vectors is switched in some manner for each retransmission attempt and in so doing spatial and temporal diversity is introduced across retransmission attempts in order to increase the likelihood that the transmission will be received. In some system configurations, the transmitting device (e.g., the BS 10) may gain some knowledge about how the channel has changed and use that knowledge to compute a new set of beamforming weight vectors for a retransmission attempt. Even in that system configuration, if it is not possible to compute new or updated beamforming weight vectors because, for example, the channel information is deemed not to be reliable, the beamforming weight vector order switching technique may prove to be useful so that the application ordering of a set of beamforming weight vectors are used in the next retransmission attempt that was is different from that used in a prior retransmission attempt.

As explained above, one advantage of the order switching scheme described herein is that the receiving device is totally blind to it, i.e., the transmitting device need not inform the receiving device of the beamforming weight vectors it uses for a transmission nor the ordering of the beamforming weight vectors. If the receiver can estimate or measure the virtual channel for purposes of improving reception and decoding performance, then the effects of beamforming weight vectors and their ordering is in effect "built-in" the channel information and is essentially transparent to the decoder in the receiving device. One way to communicate channel information to the receiving device is to transmit beamformed pilot signals, e.g., pilot subcarriers, when a transmission is made. The use of pilot signals is one technique to allow the receiving device to compute information about the channel based on signals (including the pilot signals) it receives from the transmitting device.

The techniques described herein are applicable to any wireless communication system including those that use a multiple access scheme including frequency division multiple access (FDMA), time division multiple access (TDMA), multi-carrier code division multiple access (MC-CDMA) and orthogonal frequency division multiplex multiple access (OFDMA), and any combination thereof (whether synchronized or unsynchronized) and whether deployed in a FDD or TDD configuration.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a first device, computing a plurality of beamforming weight vectors as eigenvectors corresponding to the largest eigenvalues of a matrix quantity and such that there is a preferred order in which the plurality of beamforming weight vectors are to be applied to a corresponding plurality of signals streams for an initial transmission of the plurality of signal streams from the first device to a second device, wherein the preferred order is in descending order of eigenvector by size of its corresponding eigenvalue;
   at the first device comprising a first plurality of antennas, applying the plurality of beamforming weight vectors to the corresponding plurality of signal streams for simultaneous transmission to the second device;
   determining that the plurality of signal streams need to be retransmitted from the first device to the second device; and
   switching an order in which the plurality of beamforming weight vectors are applied to the plurality of signal streams for a retransmission attempt of the plurality of signal streams from the first device to the second device, wherein switching comprises switching the order of the plurality of eigenvectors with respect to the descending order.

2. The method of claim 1, wherein said switching is performed for each retransmission attempt of the plurality of signal streams from the first device to the second device such that the order in which the plurality of beamforming weight vectors is applied to the plurality of signal streams is different for each retransmission attempt.

3. The method of claim 1, wherein switching comprises cyclically shifting the order of the plurality of beamforming weight vectors by at least one signal stream.

4. The method of claim 1, wherein said switching is performed for a retransmission without notifying the second device of the change in the order of application of the plurality of beamforming weight vectors to the plurality of signal streams.

5. The method of claim 1, and further comprising, prior to said switching, computing updates to the plurality of beamforming weight vectors between an initial transmission and a first retransmission and between subsequent retransmission attempts.

6. An apparatus comprising:
   a plurality of antennas;
   a transmitter coupled to the plurality of antennas and configured to produce individual transmit signals for transmission by respective ones of the plurality of antennas; and
   a controller coupled to the transmitter, wherein the controller is configured to:

compute a plurality of beamforming weight vectors as eigenvectors corresponding to the largest eigenvalues of a matrix quantity and such that there is a preferred order in which the plurality of beamforming weight vectors are to be applied to a corresponding plurality of signals streams for an initial transmission of the plurality of signal streams to an other communication apparatus having a plurality of antennas, wherein the preferred order is in descending order of eigenvector by size of its corresponding eigenvalue;

apply the plurality of beamforming weight vectors to the corresponding plurality of signal streams for simultaneous transmission to the other communication apparatus;

determine that the plurality of signal streams need to be retransmitted to the other communication apparatus; and switch an order in which the plurality of beamforming weight vectors are applied to the plurality of signal streams for a retransmission attempt of the plurality of signal streams to the other communication apparatus such that the order of the plurality of eigenvectors is switched with respect to the descending order.

7. The apparatus of claim 6, wherein the controller is configured to switch the order of the plurality of beamforming weight vectors for each retransmission attempt such that the order in which the plurality of beamforming weight vectors is applied to the plurality of signal streams is different for each retransmission attempt.

8. The apparatus of claim 6, wherein the controller is configured to switch the order of the plurality of beamforming weight vector by cyclically shifting the order by at least one signal stream.

9. The apparatus of claim 6, wherein the controller is configured to switch the order of plurality of beamforming weight vectors without notifying the other communication apparatus of the change in the order of application of the plurality of beamforming weight vectors to the plurality of signal streams.

10. The apparatus of claim 6, wherein the controller is configured to compute updates to the plurality of beamforming weight vectors between an initial transmission and a first retransmission and between subsequent retransmission attempts prior to switching the order of the beamforming weight vectors.

11. A processor readable medium encoded with instructions that, when executed by a processor, the processor is operable to:

compute a plurality of beamforming weight vectors as eigenvectors corresponding to the largest eigenvalues of a matrix quantity and such that there is a preferred order in which the plurality of beamforming weight vectors are to be applied to a corresponding plurality of signals streams for an initial transmission of the plurality of signal streams to a destination communication apparatus having a plurality of antennas, wherein the preferred order is in descending order of eigenvector by size of its corresponding eigenvalue;

apply the plurality of beamforming weight vectors to the corresponding plurality of signal streams for simultaneous transmission to a destination communication apparatus;

determine that the plurality of signal streams need to be retransmitted to the destination communication apparatus; and switch an order in which the plurality of beamforming weight vectors are applied to the plurality of signal streams for a retransmission attempt of the plurality of signal streams to the destination communication apparatus.

12. The processor readable medium logic of claim 11, wherein the instructions that cause the processor to switch comprises instructions that cause the processor to switch the order of the plurality of beamforming weight vectors for each retransmission attempt such that the order in which the plurality of beamforming weight vectors is applied to the plurality of signal streams is different for each retransmission attempt.

13. The processor readable medium of claim 11, wherein the instructions that cause the processor to switch comprises instructions that cause the processor to switch the order of the plurality of beamforming weight vector by cyclically shifting the order by at least one signal stream.

14. The processor readable medium of claim 11, wherein the instructions that cause the processor to switch comprise instructions that cause the processor to switch the order of plurality of beamforming weight vectors without notifying the other communication apparatus of the change in the order of application of the plurality of beamforming weight vectors to the plurality of signal streams.

15. The processor readable medium of claim 11, wherein the instructions that cause the processor to compute the beamforming weight vectors comprise instructions that cause the processor to compute updates to the plurality of beamforming weight vectors between an initial transmission and a first retransmission and between subsequent retransmissions attempts prior to switching the order of the beamforming weight vectors.

16. The method of claim 5, wherein switching comprises switching with respect to the descending order of the newly computed or updated beamforming weight vectors.

17. The apparatus of claim 10, wherein the controller is configured to switch with respect to the descending order of the newly computed or updated beamforming weight vectors.

18. The processor readable medium of claim 15, wherein the instructions that cause the processor to switch comprise instructions that cause the processor to switch with respect to the descending order of the newly computed or updated beamforming weight vectors.

19. The method of claim 1, wherein computing the plurality of beamforming weight vectors comprises computing beamforming weight vectors $\vec{w}_1, \vec{w}_2, \ldots, \vec{w}_K$ which are eigenvectors corresponding to the K largest eigenvalues of the matrix quantity, where $\vec{w}_1$ is a strongest eigenvector corresponding to the largest eigenvalue and $\vec{w}_K$ is the eigenvector corresponding to the Kth largest eigenvalue, and wherein switching produces a resulting new order at the plurality of beamforming weight vectors to be applied to the K plurality of signal streams such that each signal stream among the K plurality of signal streams to be transmitted has a chance to use the strongest eigenvector $\vec{w}_1$.

* * * * *